United States Patent [19]

Nobe et al.

[11] Patent Number: 5,337,244

[45] Date of Patent: Aug. 9, 1994

[54] ON-BOARD NAVIGATION APPARATUS

[75] Inventors: Kenichi Nobe; Morio Araki; Takeharu Arakawa, all of Saitama, Japan

[73] Assignee: Pioneer Electronic Corporation, Tokyo, Japan

[21] Appl. No.: 841,071

[22] Filed: Feb. 25, 1992

[30] Foreign Application Priority Data

Apr. 12, 1991 [JP] Japan .................... 3-79882

[51] Int. Cl.$^5$ .............................. G06F 15/50
[52] U.S. Cl. ................... 364/449; 364/443; 364/444
[58] Field of Search ............ 364/449, 444, 443

[56] References Cited

U.S. PATENT DOCUMENTS

| 4,736,303 | 4/1988 | Itoh et al. ............... 364/449 |
| 4,891,760 | 1/1990 | Kashiwazaki et al. ..... 364/443 |
| 4,897,792 | 1/1990 | Hosoi .................... 364/449 |
| 5,067,081 | 11/1991 | Person ................... 364/444 |
| 5,067,082 | 11/1991 | Nimura et al. ........... 364/449 |
| 5,124,924 | 6/1992 | Fukushima et al. ........ 364/449 |
| 5,173,709 | 12/1992 | Lauro et al. ............. 342/443 |

FOREIGN PATENT DOCUMENTS 63-12096 1/1988 Japan .
63-115004 5/1988 Japan .

OTHER PUBLICATIONS

Patent Abstracts of Japan, vol. 7, No. 160 (P-210)(1305) Jul. 14, 1983 (JPA 58-70125).
Proceedings of the 1990 American Control Conference, May 23-25, 1990, San Diego, Ca., H. Oshizawa et al. "Description and Performance of NAVMATE, an In-Vehicle Route Guidance System", pp. 782-787.

*Primary Examiner*—Thomas G. Black
*Assistant Examiner*—Leigh Marie Garbowski
*Attorney, Agent, or Firm*—Sughrue, Mion, Zinn, Macpeak & Seas

[57] ABSTRACT

An on-board navigation apparatus in which coordinate data of formerly set designations are held in a memory, the destination coordinate data stored in the memory are read out at the time of destination setting, and one piece of destination coordinate data is selected from the read designation coordinate data in accordance with an operation input to thereby set a destination according to the selected one piece of destination coordinate data. The arrangement can allow a user to easily set the same destination as a formerly set destination only by a simple selecting operation.

2 Claims, 5 Drawing Sheets

FIG.2

| ADDRESS | DESTINATION COORDINATE DATA |
|---------|-----------------------------|
| A 1     | DEST 1                      |
| A 2     |                             |
| A 3     |                             |
| A 4     |                             |
| ⋮       | ⋮                           |
| Amax    |                             |

ON-BOARD NAVIGATION APPARATUS

BACKGROUND OF THE INVENTION

1. Field of the Invention

The present invention relates to an on-board navigation apparatus which displays navigational information from the present location of a vehicle to a destination.

2. Description of the Related Art

There is an on-board navigation apparatus known which has map information including road data acquired by digitization of individual points on roads or streets on a map stored in a storage medium such as a CD-ROM, reads from the storage medium a group of map data of a certain area containing the present location of a vehicle, while tracking the present location, and shows the data as a map around the present vehicle location on a display as well as automatically displays the present vehicle location on the map. The type of prior art is disclosed in, for example, Japanese Provisional Patent Publication No. 63-12096.

This on-board navigation apparatus computes the direction and distance as navigational information from the present location to the destination in accordance with the outputs of sensors such as a direction sensor and a distance sensor to display the information on a display. The destination data is input by key operation of a user such as the driver to be stored as destination coordinate data in a memory. As long as this destination coordinate data is present in the memory, the direction and distance from the present location to the destination can be computed in accordance with the destination coordinate data and displayed on the display. When the distance from the present location to the destination becomes equal to a predetermined value or smaller while the vehicle is running, however, it is judged that the vehicle has arrived at the destination so that the destination coordinate data will automatically be erased from the memory, and the direction and distance will no longer be displayed. The conventional navigation apparatus therefore requires a complicated key operation even when the same destination as the previous one is to be set as a new destination.

SUMMARY OF THE INVENTION

It is therefore an object of the present invention to provide an on-board navigation apparatus which can allow a user to set the same destination as a formerly set destination through a simple operation.

According to the present invention there is provided an on-board navigation apparatus which sets a destination and displays navigational information from a present location to the destination on the basis of destination coordinate data representing the set destination and present location coordinate data representing the present location of a vehicle, the apparatus comprising a memory having a plurality of storage positions for storing the destination coordinate data, reading means for reading out the destination coordinate data stored in the memory at a time of destination setting, means for selecting one piece of destination coordinate data from the read destination coordinate data in accordance with an operation input to thereby set a destination according to the selected one piece of destination coordinate data, and writing means for, every time a destination is set, writing destination coordinate data representing the destination at a storage position being different from where destination coordinate data selected before at least one time is stored.

According to the thus designed on-board navigation apparatus, every time a destination is set, destination coordinate data representing the destination is written at a storage position in a memory being different from where previous destination coordinate data is stored to hold coordinate data of formerly set designations in the memory, the destination coordinate data stored in the memory at the time of destination setting is read out, and one piece of destination coordinate data is selected from the read destination coordinate data by an operation so that a destination can be set in accordance with the selected one piece of destination coordinate data.

BRIEF DESCRIPTION OF THE DRAWINGS

FIG. 2 is a diagram showing a registration data table;

DETAILED DESCRIPTION OF PREFERRED EMBODIMENT

Figure 1:
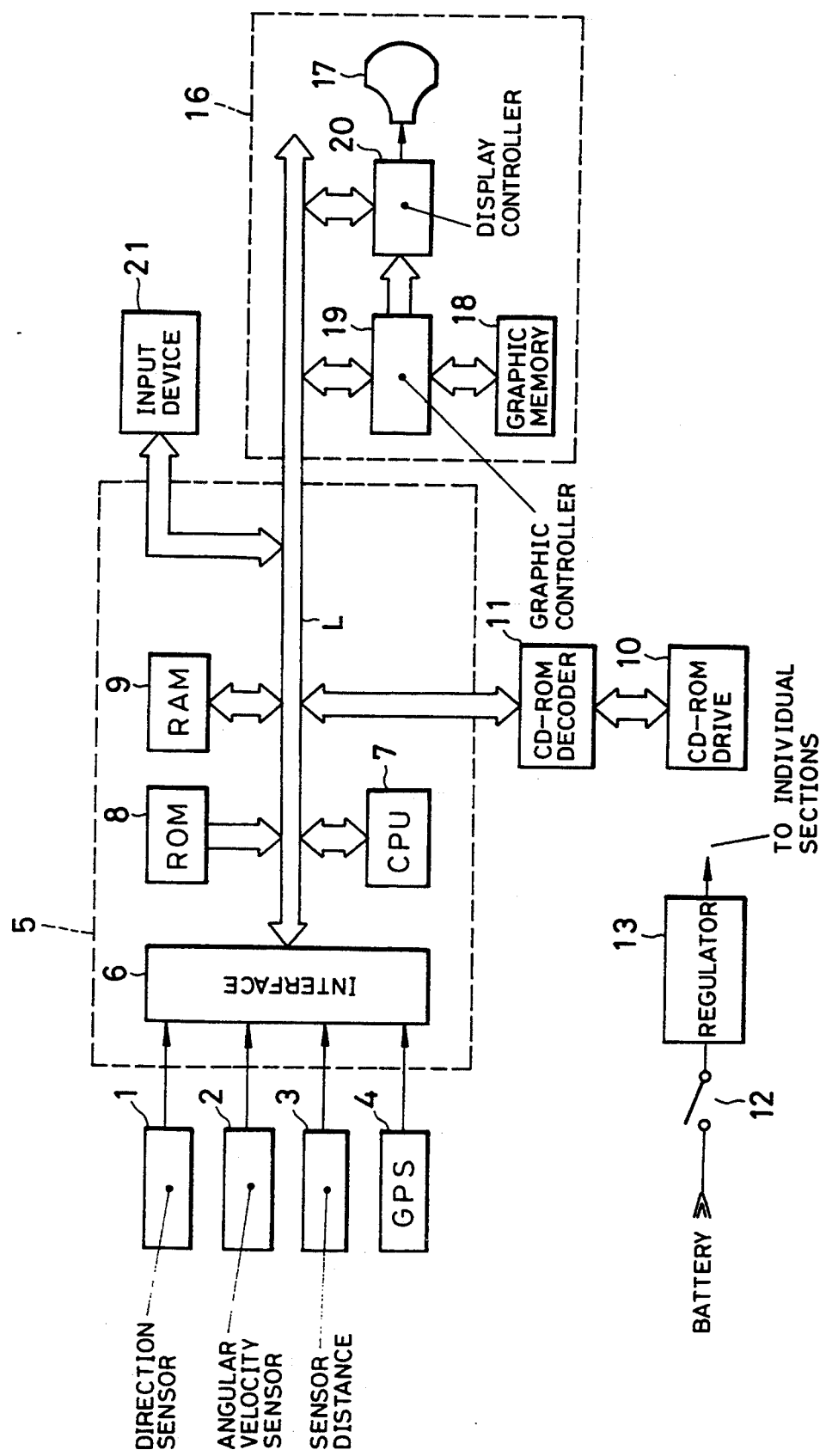
FIG. 1 is a block diagram illustrating an embodiment of the present invention.

FIG. 1 presents a block diagram of an on-board navigation apparatus according to one embodiment of the present invention. In the on-board navigation apparatus, a direction sensor 1 detects the running direction of a vehicle, an angular velocity sensor 2 detects an angular velocity of the vehicle, a distance sensor 3 detects the traveling distance of the vehicle, and a GPS (Global Positioning System) device 4 detects the absolute location of the vehicle on the basis of latitude and longitude information and the like. Detected outputs from these sensors and device are supplied to a system controller 5. A geomagnetic sensor, which detects the running direction of the vehicle on the basis of geomagnetism (geomagnetic field), can be used as direction sensor 1. The distance sensor 3 comprises a pulse generator which generates a pulse every rotation of a predetermined angle of the drive shaft (not shown) of the vehicle. The pulse generator is a known type which magnetically or optically detects the rotational angle and position of the drive shaft.

The system controller 5 comprises an interface 6, a CPU (Central Processing Unit) 7, a ROM (Read Only Memory) 8, and a RAM (Random Access Memory) 9. The interface 6 receives the detection outputs of the sensors 1 to 3 and GPS device 4 and performs processing such as A/D conversion. The CPU 7 computes the driving distance, direction, coordinates for present location (longitude and latitude), etc. of the vehicle on the basis of the data from the sensors 1 to 3 and GPS device 4 which are sequentially sent from the interface 6 as well as processes a variety of image data. In the ROM 8, various processing programs for the CPU 7 and other necessary information are previously stored. The RAM 9 is to be accessed so that information necessary for executing the programs will be written therein or read out therefrom. The RAM 9 is supplied with a voltage acquired by stabilizing the output voltage of a battery (not shown) even when the navigation apparatus is powered off, so that it may be backed up to prevent data such as destination coordinate data and a destination memory flag, which will be described later, from being erased. Also formed in the RAM 9 is a registration data table where pieces of destination coordinate data are stored at the respective addresses as shown in FIG. 2. The registration data table uses addresses A1 to Amax of the RAM 9.

For example, a CD-ROM is used as an external storage medium and is a nonvolatile read only storage medium. The external storage medium is not limited to a CD-ROM, but may be a different nonvolatile storage medium, such as a DAT or an IC card. Map data which is acquired by digitization of individual points on roads of maps, is previously stored in the CD-ROM. The information in the CD-ROM is read out through a CD-ROM drive 10. The read information from the CD-ROM drive 10 is decoded by a CD-ROM decoder 11 to be sent on a bus line L.

A source voltage from the battery through a so-called accessory switch 12 of the vehicle is regulated by a regulator 13 and supplied as a power source to the individual sections of the navigation apparatus. The voltage to be supplied to the RAM 9 does not come through the accessory switch 12 and is regulated by another regulator (not shown) different from the regulator 13.

The CPU 7 executes timer interruption to compute the direction of the vehicle on the basis of the output data of the direction sensor 1 at a given cycle. The CPU 7 also acquires longitude data and latitude data as coordinate data of the present location of the vehicle from the covered distance and direction by the interruption of every run of a predetermined distance based on the output data from the distance sensor 3. The CPU 7 collects the map data of an area of a certain range including the coordinates of the present location from the CD-ROM, and temporarily stores the data in the RAM 9 as well as supplies it to a display device 16.

The display device 16 comprises a display 17 such as a CRT, a graphic memory 18 constituted of a V (Video)-RAM or the like, a graphic controller 19, and a display controller 20. The graphic controller 19 writes the map data sent from the system controller 5 into the graphic memory 18 as image data and generates the data. The display controller 20 performs such control as to display a map on the display 17 in accordance with the image data generated from the graphic controller 19. An input device 21 is constituted by a keyboard or the like and issues various commands and the like to the system controller 5 by the key operation of a user. The keys include a set key for setting a destination, numerical keys for selecting the items displayed on the display 17, and a destination return key for returning formerly set destinations; none of which keys are shown.

Figure 3:
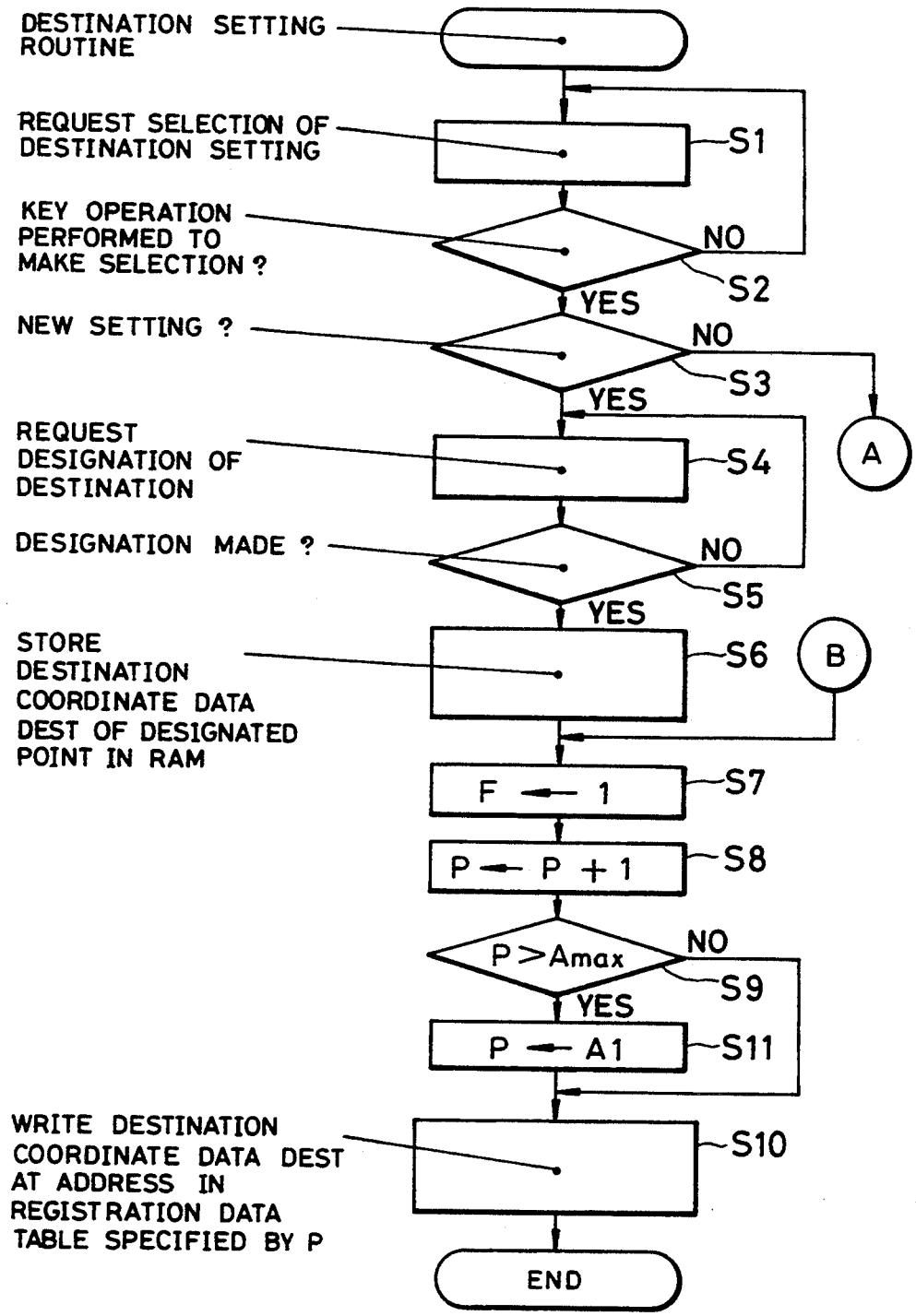
FIG. 3 is a flowchart illustrating a routine for setting a destination.
Figure 4:
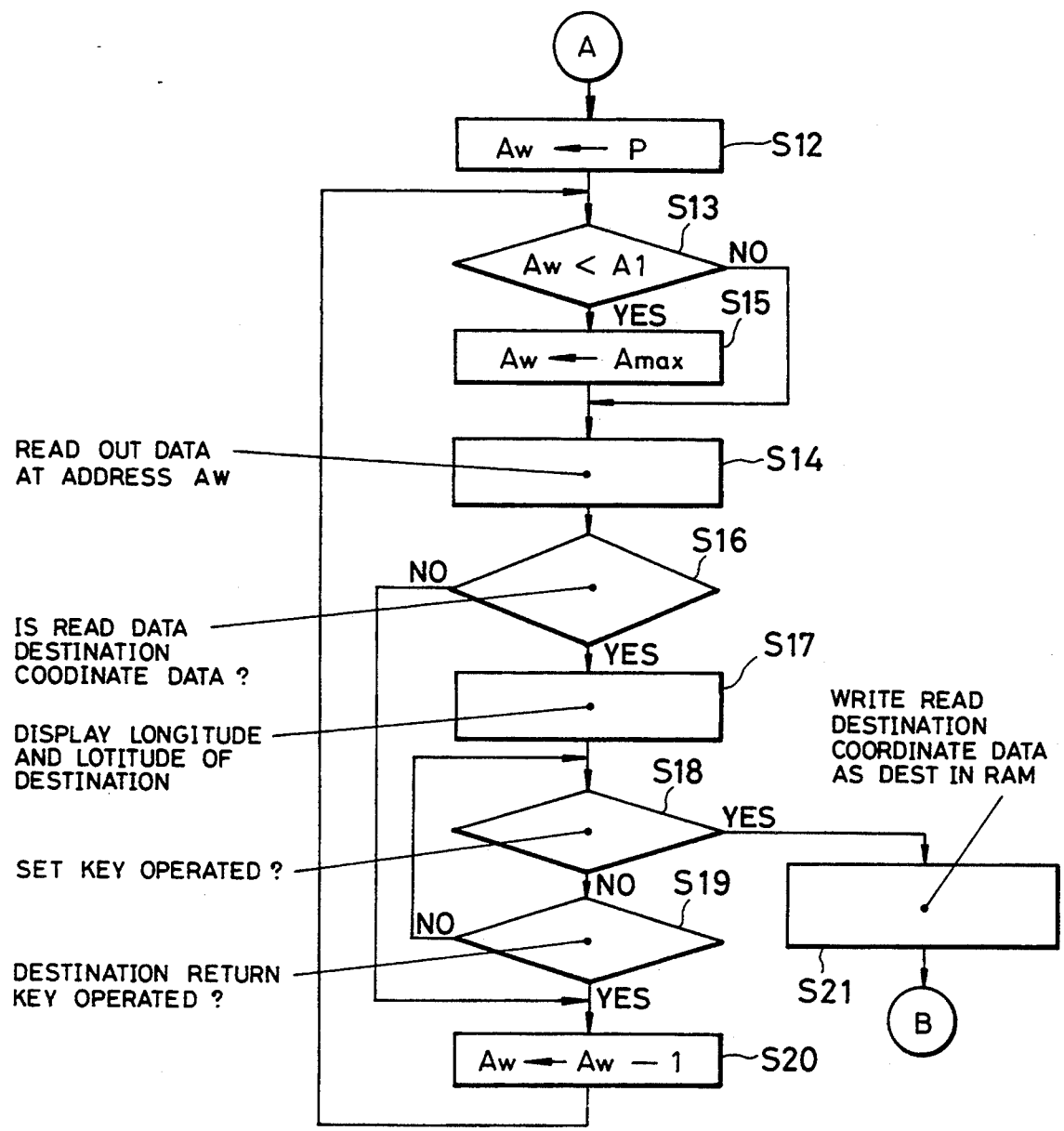
FIG. 4 is a flowchart showing a continuation of the destination setting routine shown in FIG. 3.

The destination coordinate data writing operation which is executed by the CPU 7 will be described in accordance with the destination setting routine illustrated as flowcharts in FIGS. 3 and 4. The routine is accessed and executed when a setting menu is selected by the key operation of the user through the input device 21 during execution of the main routine (not shown). The present location of the vehicle is checked on the basis of individual output data of the sensors 1 and 3, a group of map data of an area of a certain range including the present location is read out from the CD-ROM to be displayed as maps around the present location on the display 17, and a position indicator representing the vehicle's present location is displayed on the map.

In the destination setting routine, the CPU 7 first requests the selection of destination setting (step S1). The CPU 7 displays, for example, "1. Selection of Registered Data; and 2. New Setting" on the display 17, thereby allowing a user to select either choice by performing the proper key operation through the input device 21. The CPU 7 determines whether any key operation has been performed to make the selection (step S2). When the key operation has been performed, it is determined whether or not the selected destination setting is "New Setting" (step S3). If the selection of "New Setting" has been made by pressing, for example, the set key or numerical key "2" of the input device 21, the CPU 7 requests the designation of the destination (step S4). This request is made by displaying a map on the display 17 together with a message informing the user of designation of the destination on the map with a cursor using the keys of the input device 21. The CPU 7 determines whether or not any designation has been made (step S5). If the destination has been designated, the CPU 7 obtains the longitude and latitude data (x,y) of the designated point from map data, and stores the obtained data as destination coordinate data DEST in the RAM 9 (step S6).

The CPU 7 then sets a destination memory flag F to "1" (step S7), memorizing that the destination coordinate data has been set and written into the RAM 9. Further, "1" is added to a pointer P (step S8), and it is determined if the pointer P is greater than the maximum address Amax of the registration data table in the RAM 9 (step S9). The pointer P indicates the address where the destination coordinate data which is currently the last data written into the registration data table of the RAM 9 is stored. The initial value of the pointer P, immediately after the power is supplied to the RAM 9, is set to the maximum address Amax, for example. If P≦Amax, the destination coordinate data DEST is written at the storage position of the address designated by the pointer P of the registration data table (step S10). If P>Amax, the pointer P is set equal to the minimum address A1 of the registration data table (step S11). The flow then advances to step S10 where the destination coordinate data DEST is written into the registration data table. For example, the destination coordinate data DEST is written at address A1 in the registration data table as shown in FIG. 2.

If the CPU 7 determines in step S3 that "Selection of Registered Data" is selected by operating the destination return key or numerical key "1" of the input device 21, for example, address Aw is set equal to the pointer P (step S12). The CPU 7 then determines whether the address Aw is smaller than the minimum address A1 of the registration data table (step S13). If Aw≧A1, data is read out from the storage position of the registration data table which is specified by the address Aw (step S14). If Aw<A1, the address Aw is set equal to the maximum address Amax of the registration data table (step S15), and the flow moves to step S14. After the process in step S14 is performed, it is determined if the read data is the destination coordinate data (step S16). When the CPU 7 does not judge the read data as the destination coordinate data because the read data does not have a predetermined format, for example, it is insignificant to display the read data, and the flow advances to step S20 to be described later. When the read data is the destination coordinate data, the CPU 7 supplies the read data to the graphic controller 19 for displaying the destination specified by the read data on the display 17 (step S17). Through this process, the longitude and latitude of the destination are displayed on the display 17, such as "Destination: 139·30'00"E, 36.00"00"N". It is then determined if the set key of the input device 21 has been operated (step S18). If the set key has not been operated, it is determined whether or not the destination return key of the input device 21 has been operated (step S19). If the destination return key has not been operated, the flow returns to step S18. When the destination return key has been operated, the address Aw is decreased by "1" (step S20), and the flow returns to step S13. If the set key is operated, the CPU 7 stores the read destination coordinate data as the destination coordinate data DEST into the RAM 9 (step S21), advancing to step S7.

Every time the destination is set, therefore, the destination coordinate data for the destination is stored in the registration data table of the RAM 9. The storage of the destination coordinate data is repeated in order from the address A1 to address Amax. The address where the latest piece of destination coordinate data is stored is indicated by the pointer P. The address A1 is designated again after the address Amax, so that the destination coordinate data may be endlessly stored. In other words, pieces of newly set destination coordinate data can be sequentially stored by the number of addresses, starting from the address indicated by the pointer P. If "Selection of Registered Data" is selected, the destination coordinate data which was previously stored at the address Aw specified by the pointer P is first read out, and the longitude and latitude indicated by the read data are displayed on the display 17. When the destination return key of the input device 21 is operated, the address Aw is decreased by "1". The destination coordinate data before the previous one is thus read out, and the longitude and latitude indicated by the read data are displayed on the display 17. In this manner, therefore, the longitude and latitude of the destination, which has been set just before the setting of the currently displayed destination, are displayed upon every operation of the destination return key. When the set key is pressed in case that the longitude and latitude of a certain destination is displayed on the display 17, the longitude and latitude data corresponding to the displayed destination are stored as the destination coordinate data DEST into the RAM 9. The pointer P is then increased by "1", and the destination coordinate data DEST is written at the address in the data table specified by the pointer P.

In the destination setting routine, longitude and latitude data of each position is acquired from the map data recorded on the CD-ROM. The longitude and latitude data may however be input by the user through a certain key operation. Further, it is determined in step S5 whether designation is made or not; however, the routine may be modified in such a way that when no designation is detected, it is then determined if the input should be corrected so that when a request for the input correction is made, alteration of input data already designated can be allowed. There may be a case where no desired destination to be set is found from among the formerly set destinations. In this respect, therefore the routine may be modified so that when it is not judged in step S19 that the destination return key has been operated, it may be determined by another key operation whether a cancel command for canceling the present action has been issued and that if the cancel command has been issued, the destination setting routine may be terminated or, otherwise, the flow may return to step S18.

Figure 5:
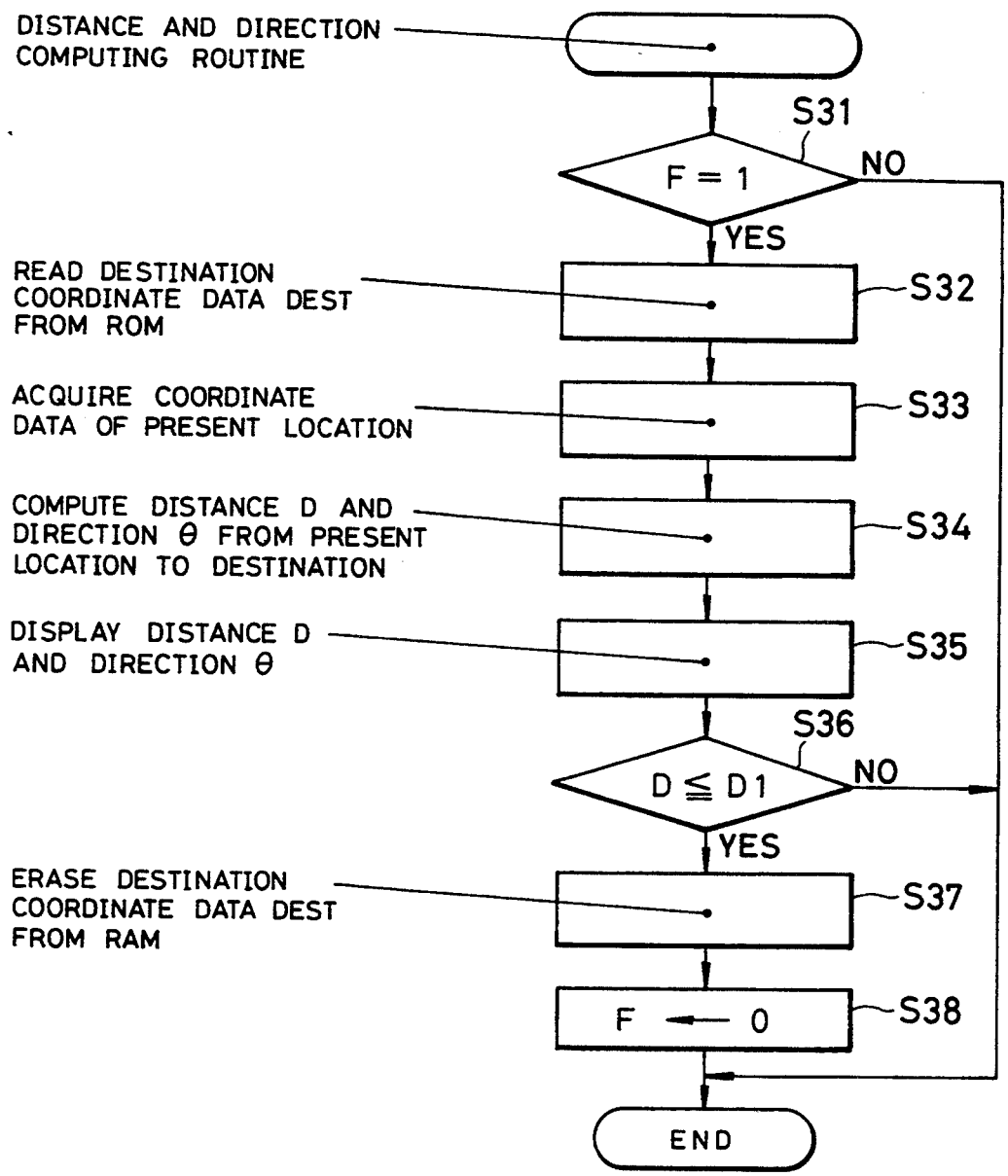
FIG. 5 is a flowchart of a routine for computing the distance and direction.

The computing operation for the distance and direction from the present location to the destination, which is executed by the CPU 7 will be described in accordance with the distance and direction computing routine illustrated as a flowchart in FIG. 5. The routine is executed as a subroutine in the above-described main routine.

In the distance and direction computing routine, the CPU 7 first determines whether or not the destination memory flag F is "1" (step S31). When F=0, which means that the destination coordinate data DEST has not been written in the RAM 9, the subroutine will be terminated immediately. When F=1, indicating that the destination coordinate data DEST is written in the RAM 9, the CPU 7 reads out the data DEST from the RAM 9 (step S32), and acquires present-location coordinate data consisting of longitude data and latitude data that represent the present location of the vehicle, on the basis of the output data of the sensors 1 and 3 (step S33). The present-location coordinate data may be obtained by, for example, a method disclosed in Japanese Provisional Patent Publication No. 63-115004. After execution of step S33, the CPU 7 calculates the distance D and direction$\theta$ from the present location to the destination on the basis of the destination coordinate data and present-location coordinate data (step S34). The CPU 7 then supplies data representing the acquired distance D and direction$\theta$ to the graphic controller 19 to display the distance D and direction$\theta$ on the display 17 for a predetermined period (step S35). The distance and direction between two points, such as the present location and destination, may be computed by, for example, a method disclosed in Japanese Provisional Patent Publication No. 60-282344. After execution of step S35, the CPU 7 determines if the distance D is equal to or smaller than a predetermined value D1 (step S36). When $D \leq D1$, the CPU 7 erases the destination coordinate data DEST from the RAM 9 because the vehicle has already arrived at the destination through the previous running (step S37). Then the CPU 7 resets the destination memory flag F to "0" (step S38) before terminating this routine. Unless the destination setting routine is executed to set a new destination, therefore, it is apparent from the flowchart of the distance and direction computing routine that the distance and direction from the present location to the destination will not be displayed. When $D > D1$, the CPU 7 terminates the routine immediately to keep the destination coordinate data in the RAM 9 because the vehicle has not arrived at the destination yet.

Although only destination coordinate data is written as data indicating a destination in the registration data table in the above embodiment, data including not only the coordinates of the destination but also the name of the destination may be written in the registration data table so that the destination name can also be displayed on the display 17. Further, a plurality of destination names and the longitudes and latitudes of the destinations may be displayed on the display 17 at a time to permit the user to select a single desired destination from among the group of the destinations.

According to the on-board navigation apparatus of the present invention, every time a destination is set, destination coordinate data representing the destination is written at a storage position in a memory. The storage position is different at least from where previous destination coordinate data is stored to keep coordinate data of formerly set designations in the memory. The destination coordinate data stored in the memory at the time of destination setting is read out, and one piece of destination coordinate data is selected from the read destination coordinate data by an operation so that a destination can be set in accordance with the selected one piece of destination coordinate data. The user can therefore easily set the same destination as a formerly set destination only by a simple selecting operation.

What is claimed is:

1. An on-board navigation apparatus for setting a destination and displaying navigational information from a present location to the destination on the basis of destination coordinate data representing the set destination and present location coordinate data representing the present location of a vehicle, the apparatus comprising:

a memory having a plurality of storage positions for storing the destination coordinate data;

reading means for reading out said destination coordinate data stored in said memory at a time of destination setting;

means for selecting one piece of destination coordinate data from the read destination coordinate data in accordance with an input instruction to thereby set a destination according to the selected one piece of destination coordinate data; and writing means for, every time a new destination is set by an operator, permanently writing new destination coordinate data representing the new destination at a storage position, said storage position being different from other storage positions where previously selected destination coordinate data is stored, so that said new destination coordinate data can be retrieved at a later time.

2. An on-board navigation apparatus according to claim 1, wherein said reading means reads out the destination coordinate data piece by piece in an order reverse to a writing order in accordance with an input instruction.

* * * * *